United States Patent
Asadi

(10) Patent No.: US 11,885,415 B2
(45) Date of Patent: Jan. 30, 2024

(54) CVT AUTOMATIC VARIATOR TRANSMISSION FOR A BICYCLE

(71) Applicant: YESIL KOMPRESOR KLIMA TASARIM IMALAT SANAYI VE TICARET LIMITED SIRKETI, Istanbul (TR)

(72) Inventor: Peyman Asadi, Istanbul (TR)

(73) Assignee: YESIL KOMPRESOR KLIMA TASARIM IMALAT SANAYI VE TICARET LIMITED SIRKETI, Istanbul (TR)

( * ) Notice: Subject to any disclaimer, the term of this patent is extended or adjusted under 35 U.S.C. 154(b) by 255 days.

(21) Appl. No.: 17/609,414

(22) PCT Filed: May 27, 2019

(86) PCT No.: PCT/TR2019/050383
§ 371 (c)(1),
(2) Date: Nov. 8, 2021

(87) PCT Pub. No.: WO2020/153915
PCT Pub. Date: Jul. 30, 2020

(65) Prior Publication Data
US 2022/0213948 A1    Jul. 7, 2022

(51) Int. Cl.
| | |
|---|---|
| *F16H 9/16* | (2006.01) |
| *B62M 9/06* | (2006.01) |
| *B62M 11/06* | (2006.01) |
| *F16H 57/031* | (2012.01) |
| *F16H 57/04* | (2010.01) |

(52) U.S. Cl.
CPC ............... *F16H 9/16* (2013.01); *B62M 9/06* (2013.01); *B62M 11/06* (2013.01); *F16H 57/031* (2013.01); *F16H 57/0416* (2013.01)

(58) Field of Classification Search
CPC ...... F16H 9/16; F16H 57/031; F16H 57/0416; B62M 9/06; B62M 11/06
USPC .......................................................... 474/29
See application file for complete search history.

(56) References Cited

U.S. PATENT DOCUMENTS

2017/0248206 A1 *  8/2017  Baek ....................... F16H 21/28

FOREIGN PATENT DOCUMENTS

| CN | 2356933 | Y | * | 1/2000 |
| CN | 2356933 | Y |   | 1/2000 |
| CN | 2375558 | Y | * | 4/2000 |
| CN | 2375558 | Y |   | 4/2000 |
| JP | H09315373 | A | * | 12/1997 |

(Continued)

*Primary Examiner* — Gene O Crawford
*Assistant Examiner* — Emily R Kincaid
(74) *Attorney, Agent, or Firm* — Bayramoglu Law Offices LLC

(57) ABSTRACT

A CVT variator transmission box for using on a bicycle is provided. The CVT variator transmission box increases or decreases a speed of a rotation of pedals or hands when a form of a motion transmission is provided; and the CVT variator transmission box introduces a new variator gearbox with a CVT variator transmission mechanism capable of transmitting to a front wheel or a rear wheel by increasing or decreasing the speed from the pedals or the hands when the form of the motion transmission is provided. The CVT variator transmission box is positioned on any part of the front wheel, the rear wheel or on a frame of the bicycle.

9 Claims, 2 Drawing Sheets

(56) References Cited

FOREIGN PATENT DOCUMENTS

| | | | | |
|---|---|---|---|---|
| JP | H09315373 A | | 12/1997 | |
| KR | 20150003830 U | * | 10/2015 | |
| KR | 20150003830 U | | 10/2015 | |
| TR | 201503566 | | 7/2017 | |
| WO | 9509101 A1 | | 4/1995 | |
| WO | WO-9509101 A1 | * | 4/1995 | ............... B60B 5/02 |
| WO | WO-2006010304 A1 | * | 2/2006 | ............ B62M 9/123 |

* cited by examiner

US 11,885,415 B2

CVT AUTOMATIC VARIATOR TRANSMISSION FOR A BICYCLE

CROSS REFERENCE TO THE RELATED APPLICATIONS

This application is the national stage entry of International Application No. PCT/TR2019/050383, filed on May 27, 2019, the entire contents of which are incorporated herein by reference.

TECHNICAL FIELD

The invention relates to an automatic variator transmission to be used in a bicycle and can increase or decrease the rotational speed from the pedal.

BACKGROUND

The population of people living in big cities is increasing day by day. Therefore, there are significant increases in the number of vehicles used in cities. As a result of these increases, the traffic densities of the cities are also increasing. Therefore, not to spend on traffic so much and also able to do sports, people tend to use bicycles. In the state of the art, it is more preferable to use bicycles. However, the gearshift mechanism of the existing bicycles is manual, thus causing a lot of problems. The present invention describes a new automatic variator transmission and, has overcome problems such as chain throwing, frequent breakdown of gear shifting parts, in what situation suitable shifting gear is not known and similar problems.

In the current situation, variator transmission systems are a type of automatic transmission that is frequently used in vehicles and motorcycles. In the state of art, the use of variator transmission on a bicycle has not been found. This is because the speed provided by the rider is low. The present invention has overcome this problem and has allowed the variator transmission to be used in bicycles.

TR2015/03566 numbered patent document found in the research we made has "The said product of the invention is an improved transport bike and can be used in cargo and human transportation" statement.

This product according to the invention consists of 12 parts. These are rear wheel sprocket (1), movement distribution input gear (2), movement distribution shaft (3), movement distribution shaft bearing (4), speed change input sprocket (5), speed change shaft (6), speed change bearing (7), steering system (8), pedal shaft bearing (9), pedal sprocket (10), gearbox output sprocket (11), movement distribution shaft output sprocket (12).

The reference TR2015/03566 relates to a four-wheeled bicycle used in cargo and human transportation. There are a number of gears in the structure. However, the gear and CVT variator transmission mechanism of the present invention is not included in the present invention. Since speed changing is provided with a speed change box in the reference TR2015/03566, it is mentioned in a sloppy way.

Consequently, there is a need for a new variator transmission box in which the prior art is surpassed and all disadvantages are eliminated.

SUMMARY

The invention is a new variator automatic transmission system for use on a bicycle, with additional advantages, in which the prior art is surpassed, and disadvantages are eliminated.

The object of the invention is to introduce a new variator gearbox with CVT variator transmission mechanism, which can automatically increase or decrease the speed of rotation of the driver to the pedals for use on a bicycle.

Another object of the invention is to provide a new variator gearbox in which the speed of the pedal is increased before transmission to the CVT variator gearbox in order to implement the CVT variator transmission mechanism on a bicycle.

It is a further objective of the invention to provide bicycles with automatic speed control in which the rotational speed of the pedal is reached at very high speeds.

The invention is a CVT variator transmission box according to the foregoing and the following detailed description, which can increase or decrease the speed of rotation from the pedals (from the hands, if the method of transmission is provided) to for use on bicycles; a gearbox drive gear which transmits the rotational movement from the pedals (from the hands, if the method of transmission is provided) to to the input large gear, which is associated with the central axis by means of a suitable movement transmission element, said gear, which receives the rotational movement from said gear, includes the input large gear, said input includes a small gear, which transmits to the front half-shaft pulley, which is associated with the center axis, with the movement of the gearwheel taken from said large gear; said front half-shaft pulley (which may be without shaft or which may be associated with a shaft) can rotate the rear half-pulley, which is associated with a belt, rear surface oval (curved) a front half-ramped pulley comprising a front half-ramp pulley; at the rear surface includes a variator ramp plate comprising a spring direction (inwardly directed) curve; The rear half includes a spring that rotates the pulley downward when the system speed drops, and includes a rear half-shaft pulley, with the rear half-shaft pulley (which may be without shaft or which may be associated with a shaft) said rear small gear, which is connected to the center axis and associated with the rear half pulley, which is said to include a rear gear with said small gear, and comprises an output large gear, which transfers directly or via any fastening element to the front wheel or rear wheel.

BRIEF DESCRIPTION OF THE DRAWINGS

The invention will be described by referring drawings below, thus the specifications of the invention will become more understandable. However, this is not intended to restrict the invention to certain arrangements. On the contrary, it is also intended to cover all alternative, modification, and equivalents which may be included in the scope of the invention as defined by the appended claims. It should be understood that the details shown are presented only for the purpose of illustrating preferred embodiments of the invention and for providing both the shaping of the methods and the most useful and easy-to-understand description of the rules and conceptual features of the invention. In these drawings;

Figure 1:
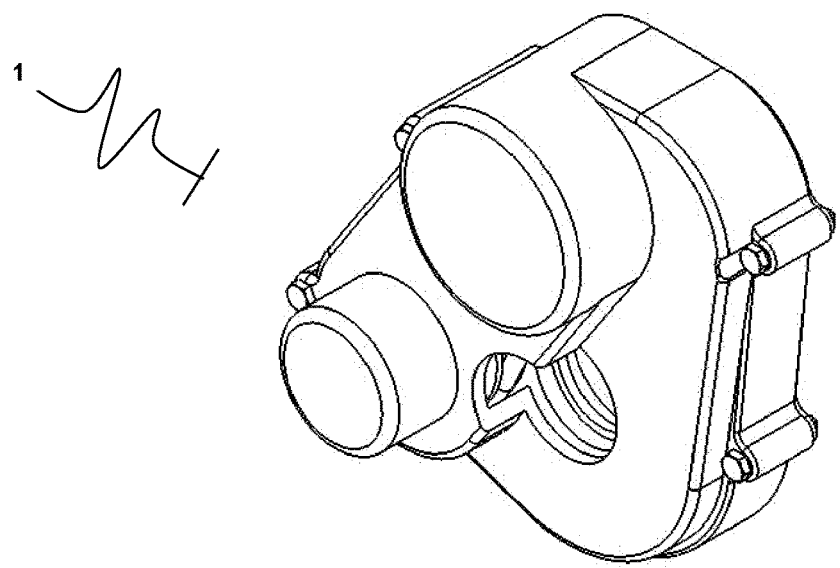
FIG. 1 is a perspective view of a variator transmission box according to the invention.

Figures to assist in the understanding of the present invention are numbered as indicated in the accompanying drawing and are given below with their names.

1. Variator transmission box
10. Body
11. Cover
12. Bolt
20. CVT Variator Transmission Mechanism
21. Spring retaining washer
22. Spring
23. Rear half pulley
24. Variator ramp plate
25. Sliding weight
26. Front half ramp pulley
261. Ramp Socket
27. Rear half shaft pulley
28. Front half shaft pulley
29. Belt
30. Front small gear
31. Output large gear
32. Input large gear
33. Transmission drive gear
34. Bearing
35. Nuts
36. Rear small gear

DETAILED DESCRIPTION OF THE EMBODIMENTS

In this detailed description, said the CVT variator transmission box (1) is intended only for a better understanding of the subject and is illustrated by examples which will not restrict it. In this description, a CVT variator transmission box (1) is described, used for a bicycle, which can increase or decrease the speed of the rotation movement from the pedal.

FIG. 1 shows a representative view of the variator transmission box (1) according to the invention. The variator transmission box (1) comprises a mechanism for transmitting or reducing the rotation of the cycling pedal to the front wheel or rear wheel. The operating principle of the mechanism will be explained in detail below. The variator transmission box (1) can be positioned on the front wheel or rear wheel on a bicycle. In addition, it is mounted on a bicycle frame and transmits the rotating movement from the pedal to the front wheel or the rear wheel by means of a chain and similar transmission elements. It can be positioned on any part of the bike. What is important here is not how it is positioned, but how it increases or decreases the rotational movement of the pedal. The variator transmission box (1) may comprise metal or plastic parts. Variator transmission box (1) and the elements contained therein can be manufactured to be completely plastic, completely metal or some parts metal and some others plastic. The variator transmission box (1) may comprise a cooler to prevent it from heating. The said cooling device may be a refrigerant supplied by a fan or a variety of fluids.

Figure 2:
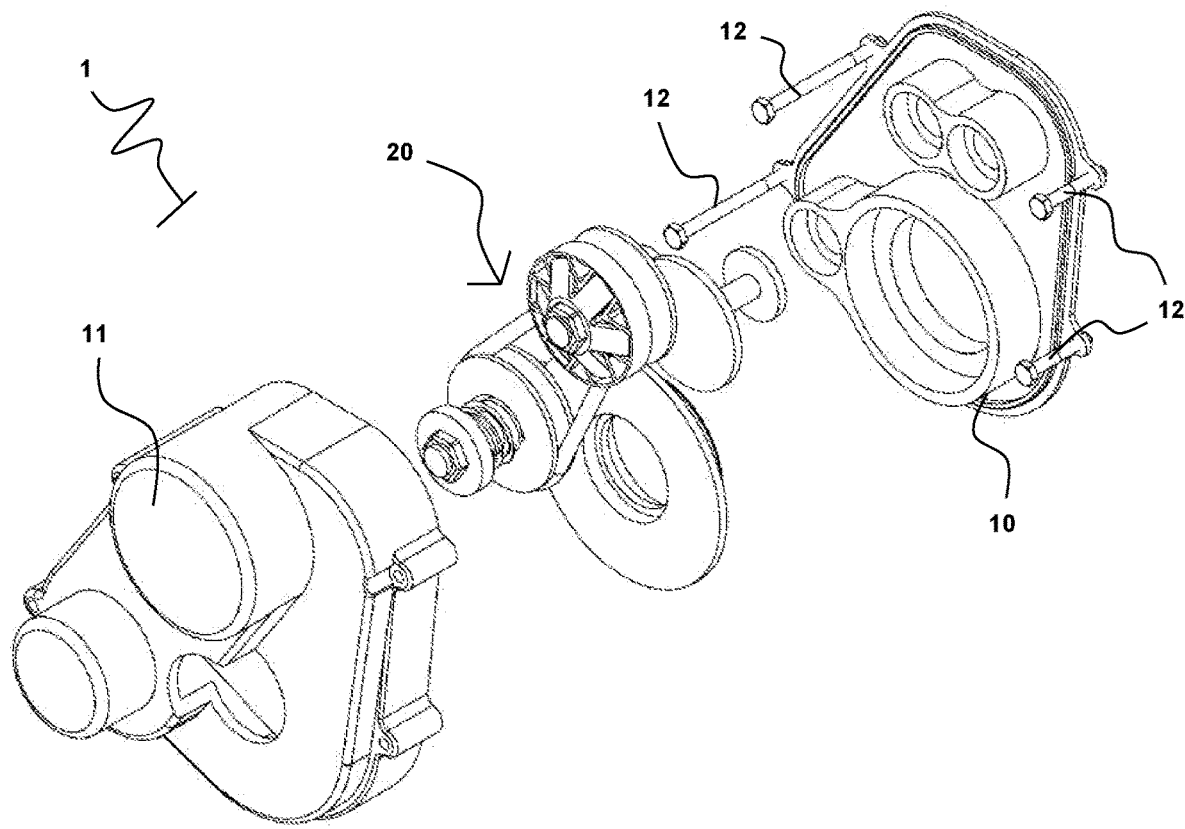
FIG. 2 is an exploded view of the variator transmission box according to the invention.

In FIG. 2, the variator transmission box (1) of the invention is presented with an exploded mounting view. Accordingly, the variator transmission box (1) comprises a body (10), a CVT variator transmission mechanism (20) located on the body (10) and a cover (11) which protects the CVT variator by surrounding the transmission mechanism (20). Here, the CVT variator transmission mechanism (20) is fitted to the mounting grooves on the body (10) and the cover (11) is closed and the body (10) and the cover (11) are secured by tightening with bolts (12). The CVT variator transmission mechanism (20) has an operating principle as in variator systems. In the invention, the automatic increase or decrease in the speed of the rotational movement from the pedals is provided by the CVT variator transmission mechanism (20).

Figure 3:
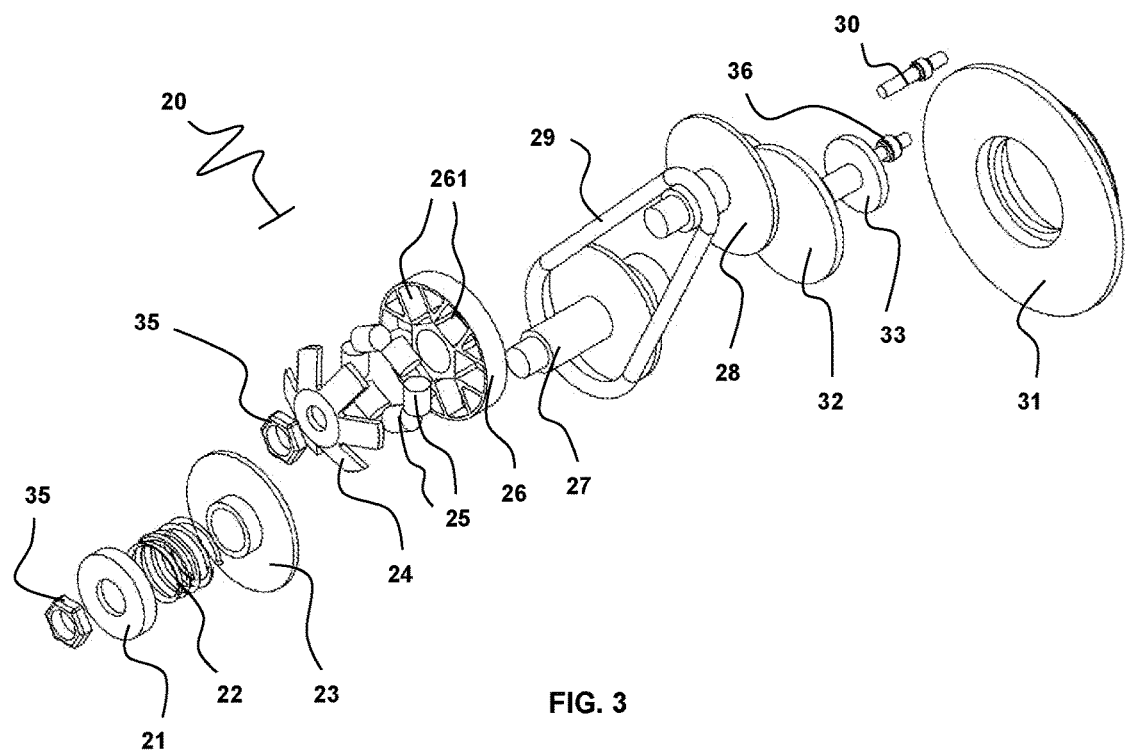
FIG. 3 is the exploded view of the CVT variator transmission mechanism in the invention.
Figure 4:
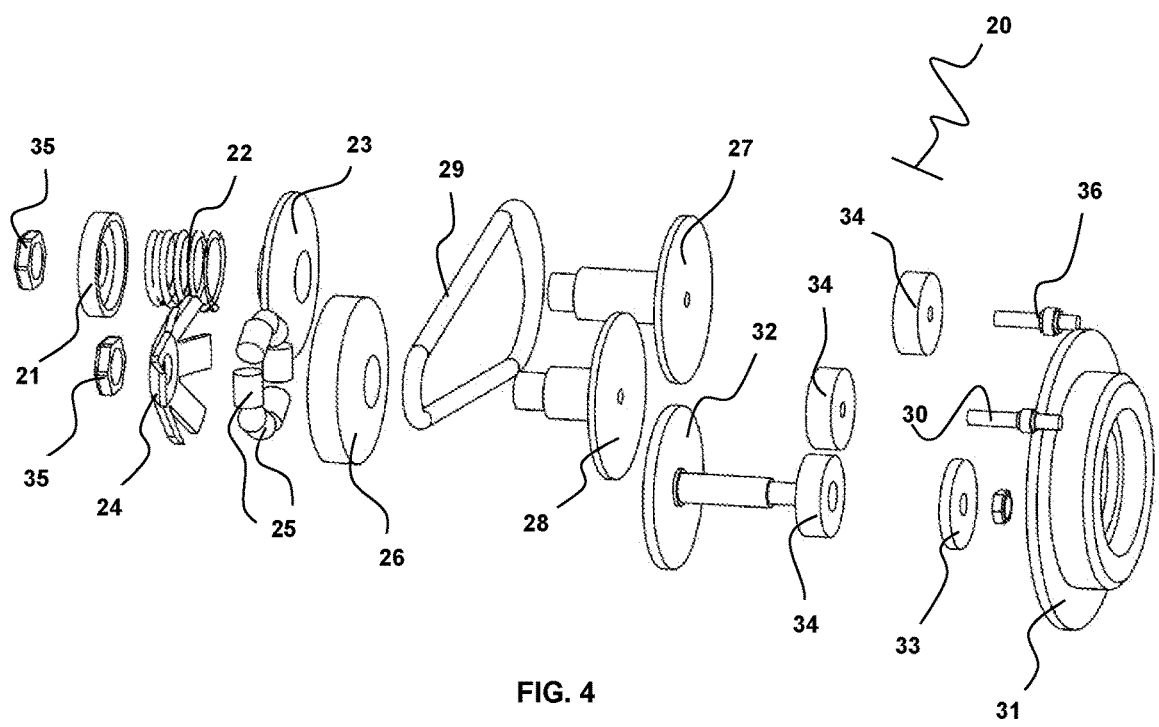
FIG. 4 The CVT variator transmission mechanism in the present invention is an exploded view.

FIGS. 3 and 4 show the exploded installation views of the CVT variator transmission mechanism (20) in the invention. Variator systems are machine elements that transmit movement in variable speed intervals by means of belts and pulleys. In addition to the CVT variator transmission mechanism variator system, it also includes gear mechanisms that increase the speed of the rotation movement from the pedal. The most important reason for this is that the variator systems cannot operate at low speeds. In the CVT variator transmission mechanism (20), the transmission drive gear (33) is associated with a chain or a different connection element to a bicycle's pedal. The transmission drive gear (33) which rotates with the drive from the pedal rotates the input large gear (32) to which it is connected. The input large gear (32) rotates the front small gear (30) to which it is connected, increasing the speed from the pedal slightly. In this way, the speed of movement from the pedal can be used by the variator. The front small gear (30) is connected with the front half-shaft pulley (28) from the axis section. At the same time, the front half shaft pulley (28) also rotates with the rotation of the front small gear (30). The front half-ramp pulley (26) positioned on the front half-shaft pulley (28) also rotates. In the front half-ramp pulley (26), ramp slots (261) are provided. Sliding weights (25) are provided within these ramps (261). After the sliding weights (25) are placed in the ramped slots (261) in the front ramp half pulley (26), the variator ramp plate (24) is inserted and tightened with a nut (35) (FIG. 2). As the front half-ramp pulley (26) rotates, the sliding weights (25) in the ramp slots (261) moves towards the outer wall of the front half-ramp pulley 26 with the effect of the centrifugal force. During this, the sliding weight (25) moves in the direction of the oval shape of both the front half ramp pulley (26) and the variator ramp plate (24). In this case, while the sliding weights (25) move towards the outer surface, the front half pushes the ramp pulley (26) down in the direction of the transmission drive gear (33). The front half-ramp pulley (26) has an oval bottom surface. In this case, since the front half-ramp pulley (26) descends, the diameter at which the belt (29) grips the front half-ramp pulley (26) increases. Since the length of the belt (29) remains the same as the diameter is increased here, the belt (29) apply pressure on the rear half pulley (23) to which it is associated and moves the rear half pulley (23) in the direction of the spring (22). The spring (22) tightens and the belt (29) grips and rotates the rear half-pulley (23) at a minimum diameter. Belt (29) grips the front ramp half pulley (26) to a maximum diameter, and the rear half pulley (23) to a minimum diameter. This is the case with the highest speed. When the pedal drive is leaved or the speed falls, the sliding weights (25) in the front half ramp pulley (26) are guided to the center. When the pedal drive is released or the speed decreases, the sliding weights (25) in the front half ramp pulley (26) are directed to the center. In this case, the pressure on the front ramp half pulley (26) is lifted and the front ramp half pulley (26) moves in the direction of the spring (22). In this case, the belt (29) grips the front half ramp pulley (26) with a minimum diameter. In this case, the spring (22) moves the rear half pulley (23) in the direction of the drive gear (33) of the transmission and moves it down. The belt (29) grips and rotates the rear half-pulley (23) at a maximum diameter from the oval surface on the lower surface of the rear half-pulley (23). Belt (29) grips the front ramp half pulley (26) at a minimum diameter and the rear half pulley (23) at a maximum diameter. This is the case with the lowest speed. As it can be seen, through the CVT variator transmission system (20), it is possible to increase or decrease the speed and thus a new transmission with a continuously variable ratio which can be adapted to a bicycle, the CVT variator transmission, is introduced. When the rear half pulley (23) rotates at low or high speed, the rear half shaft pulley (27) also rotates. The rear half-shaft pulley (27) is associated with the rear small gear (36) from its center axis. The rear small gear (36) is associated with the output large gear (31).

The output large gear (31) allows the bicycle to move by associating with a movement transmission element and the front wheel and rear wheel. Thus, the speed of the rotational movement from the pedals is increased and reduced to the front wheel or rear wheel. In the invention, the spring (22) is mounted to the rear half pulley (23) via a spring holding bolt (21) and nut (35). In the invention, the gear and the pulleys are interlocked with the bearings (34). It can be seen from the drawings that six sliding weights 25 are used in the invention. The number of sliding weights (25) can be increased or decreased. Similarly, the weight dimensions of the sliding weights (25) may also vary. The gears in the invention may include a different number of thread pitches, diameter measurements, geometric shapes. The movement transmission is similar to the gear system, it can also be provided with a movement transmission method. In order to increase or decrease the speed in the desired amount, a diameter of the gear and pulleys can be modified in the scales allowed by the design. In the invention, any system, mechanism or movement transmission elements can be used instead of gears. The belt (29) of the invention may be made of petroleum or metal raw materials. The angle of the oval surfaces on the variator ramp plate (24), the front half-ramp pulley (26) and the rear half-pulley (23) can be adjusted at the desired level. This will directly affect the moving distance back and forth movement of the pulleys (26, 27) as well as the max and min values of the speed. For this reason, it is possible to change rates according to the demand.

What is claimed is:

1. A CVT variator transmission box for a bicycle, wherein the CVT variator transmission box increases or decreases a speed of a rotational movement from pedals or from hands when a movement transmission method is provided, the CVT variator transmission box comprises
    a transmission drive gear, wherein the transmission drive gear transmits the rotational movement from the pedals or from the hands to an input large gear through with a chain or a suitable movement transmission element, wherein the transmission drive gear is connected to the chain or the suitable movement transmission element from a central axis;
    the input large gear, wherein the input large gear receives the rotational movement from the transmission drive gear and transmits the rotational movement to a front small gear in order to increase the speed;
    the front small gear, wherein the front small gear transmits the rotational movement received from the input large gear, in speed as increased, to a front half-shaft pulley, wherein the front half-shaft pulley is associated with the front small gear from the center axis;
    the front half-shaft pulley, wherein the front half-shaft pulley rotates a front half-ramp pulley positioned above on the front half-shaft pulley, by receiving the rotational movement from the front small gear,
    the front half-ramp pulley with an oval shape or curved shape on a rear surface of the front half-ramp pulley, wherein the front half-ramp pulley turns with the front half-shaft pulley, wherein the front half-shaft pulley is without a shaft or the front half-shaft pulley is associated with the shaft and the front half-ramp pulley rotates a rear half pulley associated with the front half-ramp pulley via a belt;
    sliding weights, wherein the sliding weights are positioned in ramp slots within the front half-ramp pulley and move towards a lateral surface of the front half-ramp pulley with an effect of a centrifugal force as the front half-ramp pulley rotates;
    a variator ramp plate placed on the front half-ramp pulley and located on the rear surface of the front half-ramp pulley in a direction of a spring in an inwardly curved shaped,
    the rear half pulley, wherein the rear half pulley is rotated by the front half-ramp pulley via the belt, and with a rear surface convex curved;
    the belt, wherein the belt transmits a movement between the rear half pulley and the front half-ramp pulley;
    the spring, wherein the spring takes the rear half pulley back to an original position of the rear half pulley by pushing the spring down when a system speed drops;
    a rear half-shaft pulley located at a bottom of the rear half pulley and rotating together with the rear half pulley;
    a rear small gear associated with the rear half-shaft pulley, wherein the rear half-shaft pulley is without the shaft or the rear half-shaft pulley is associated with the shaft on a center axis of the rear small gear and rotating with the rear half-shaft pulley; and
    an output large gear, wherein the output large gear receives the rotational movement from the rear small gear, and transmits the rotational movement, directly or via any connecting element to a front wheel or a rear wheel.

2. The CVT variator transmission box according to claim 1, wherein a CVT variator transmission mechanism located on the body comprises a cover, wherein the cover protects a surrounding of the CVT variator transmission mechanism.

3. The CVT variator transmission box according to claim 1, wherein a fixing washer retaining the spring on the rear half pulley.

4. The CVT variator transmission box according to claim 1, wherein in the ramp slots, the sliding weights are positioned in the front half-ramp pulley and the ramp slots are movable under the effect of the centrifugal force.

5. The CVT variator transmission box according to claim 1, comprising bearings allowing gears and pulleys to be rotated.

6. An automatic variator transmission for a bicycle, wherein the automatic variator transmission increases or decreases a speed of a rotational movement from a pedal, wherein
    in order to increase the speed of the rotational movement, the automatic variator transmission transmits the rotational movement from the pedal when the pedal is actuated or the rotational movement from hands, to a front half-ramp pulley through a pedal drive gear, an input large gear, a front small gear and a front half pulley, wherein
        due to a curve of a variator plate and an ovality of an inner surface of the front half-ramp pulley, sliding weights moving under an effect of centrifugal forces in downward ramping grooves of the front half-ramp pulley push the front half-ramp pulley in a direction of the pedal drive gear, as a result of pushing, a belt attached to a rear surface of the front half-ramp pulley grips the front half-ramp pulley with a maximum diameter to ensure a high speed running with the front half-ramp pulley, wherein the front half-ramp pulley is pushed downwards the belt becomes shorter due to gripping the front half-ramp pulley at the maximum diameter, pushes a rear half-pulley on a rear oval curved surface, pushing a spring upwards to tighten a spring, and grasps the rear half-pulley at a minimum diameter, in order to decrease of the speed of the front half-ramp pulley decelerated by releasing the pedal drive gear, wherein the automatic variator transmission is applied by the pedals or by the hands, wherein a movement of the sliding weights in a central direction of the front half-ramp pulley in the downward ramp grooves, a movement of the front half-ramp pulley as a result of the movement of the sliding weight, in order to reduce the speed, the belt grips the front half-ramp pulley at the minimum diameter as a result of an upward movement of the front half-ramp pulley, pushing of the spring the rear half-pulley downwards, the belt grips in an outward direction, a curved surface located on a bottom surface of the rear half-pulley pushed downward, grips the rear half-pulley at the maximum diameter, a reduced speed of the belt is transmitted with the front half-ramp pulley at the minimum diameter, the rear half-pulley at the maximum diameter, to an output large gear via a rear half shaft pulley and a rear small gear.

7. The CVT variator transmission box according to claim 1, wherein the bicycle is configured to be positioned on any section of the front wheel, the rear wheel or on a frame of the bicycle.

8. The CVT variator transmission box according to claim 1, wherein a number and a mass of the sliding weights used are increased or decreased according to a purpose.

9. The CVT variator transmission box according to claim 1, wherein a refrigerant is provided by fans or refrigerants are provided to protect the CVT variator transmission box from heating.

* * * * *